Patented May 17, 1938

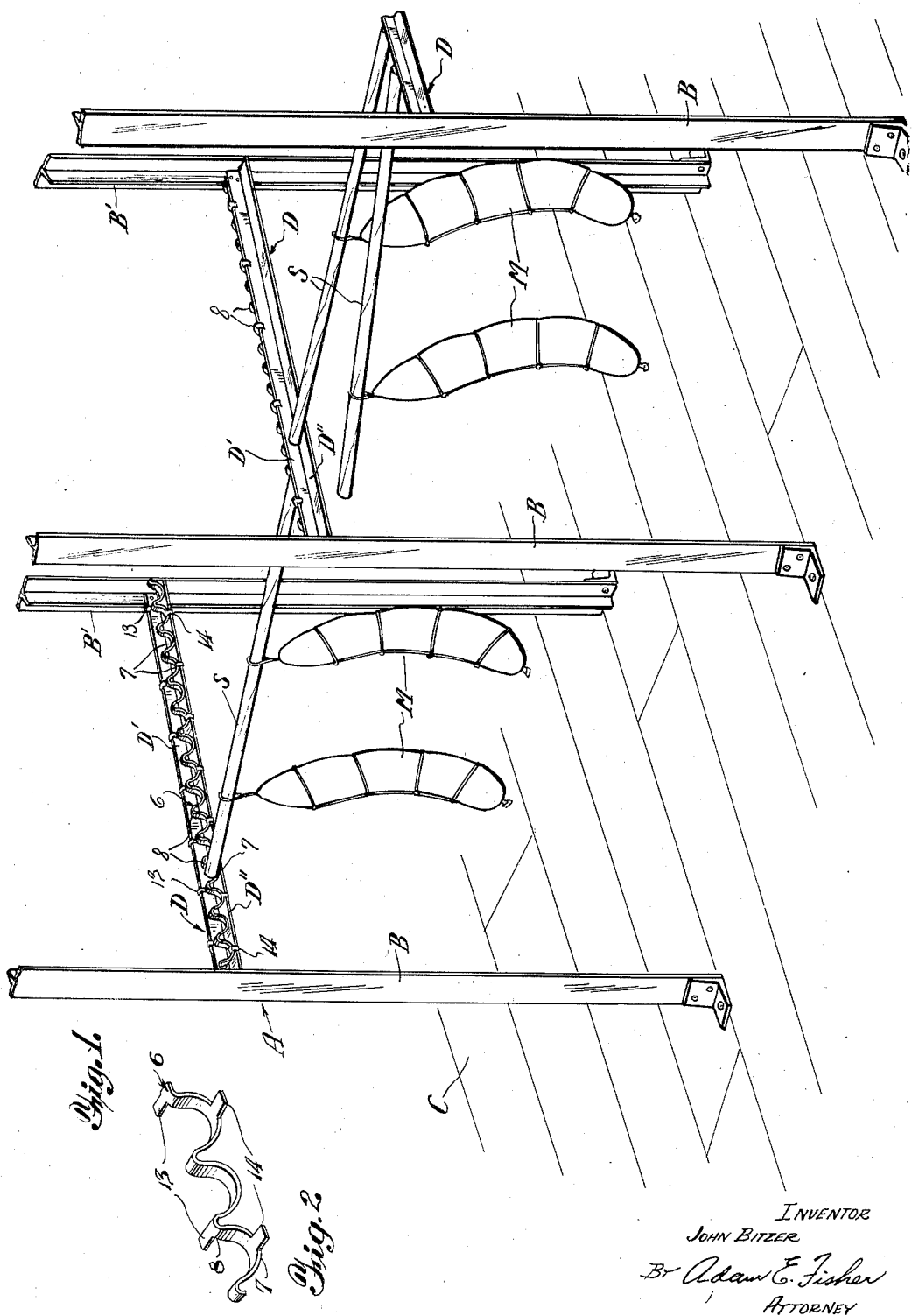

2,117,285

UNITED STATES PATENT OFFICE 2,117,285

STICK HANGER

John Bitzer, St. Louis, Mo.

Application March 16, 1936, Serial No. 69,057

2 Claims. (Cl. 17—44.4)

My invention relates to improvements in stick hangers.

In the meat packing industry the various sausages, hams and other small meats are hung in rows on "sticks," which are named according to their use as sausage sticks, smoke sticks, and so on. These sticks are then arranged in bins, racks or trucks, the sticks resting freely at their ends on angle irons or cross members so as to support the sausages and meats in depending rows along the sticks. In the case of the bins or racks the sausages and meats are hung therein for storage and for display to the buyers, and it occurs that these buyers in looking over the sausages or meats and raising them for this purpose often pull off one end of the stick from its supporting member, with the result that the stick falls to the floor. Since sausages, particularly when yet warm, are very easily broken, this contact with the floor results in much breakage and loss to the packer. Also contact with the floor soils and mars either the sausage or the meats, and they must then be sold at a reduced price representing a loss to the packer even when breakage does not occur. In the case of the trucks, these are used not only as display means but primarily for transporting the sausages or meats from place to place around the plant, as to the chill room, packing room, smoke house, and so on. Now, with the sticks loosely placed at their ends in the supports on the truck, they are very apt to slip off due to the vibration and bumping of the truck over the floor, and it is necessary then that the sticks be all jammed together to prevent so far as possible the sticks from falling. However, fresh cooked sausages, such as pork sausage, are very soft, and when they are jammed together as above they are readily mashed, broken and discolored and reduced in value. Then, for proper chilling and drying it is necessary that the sticks be moved apart again to allow free circulation of air around the sausages and meats, and this labor amounts to a very considerable part of the expense, since the sticks must be moved together and then apart several times during the course of the travel of the trucks from the cooking room to the packing room and intermediate points.

With the above facts in view it is the main object of my invention to provide a hanger or support for the sticks which will prevent them from slipping off and falling and which will maintain the sticks at all times at such spacing that the sausages and meats thereon will be held out of damaging contact. This form of hanger therefore at one stroke eliminates the loss and waste due to sticks falling and injuring the sausages and meats thereon and the labor now necessary in moving the sticks together and then apart while the trucks are being moved from room to room.

Another object is to provide an improved stick hanger means which may be readily attached to bins and trucks now in use or for new fixtures, readily built therein or made an integral initial part thereof.

A further object is to provide a stick hanger means of this kind which comprises an elongated corrugated, serrated, sinuous or undulating strip which may be readily attached to the support members or angle irons in the bins and trucks and by virtue of its undulent form provides spaced sockets, valleys or seats in which the ends of the sticks may be dropped and therein held against falling and held in fixed spaced relation.

Still a further object is to provide a hanger strip of this kind having means by which it may be readily attached to the bin or truck support members without alteration or other work thereon.

With these and other objects in view the invention resides in the novel construction and arrangement of parts as hereinafter fully set forth and claimed, reference being had to the accompanying drawing as showing a preferred embodiment of my invention for purposes of exemplification.

In the drawing:

Figure 1 is a perspective view of a portion of a conventional packing house bin showing sausages being on sticks therein, my improved hanger strip being shown applied to a part of the bin and showing also how the sticks fall when my strips are not used.

Figure 2 is a fragmentary perspective view of one of my hanger strips alone.

Referring now with more particularity to the drawing, a conventional form of packing house bin is shown fragmentally at A, the same comprising vertical posts B and B' set up in spaced relation in front and rear ranks along the floor C. Angle irons D then run horizontally from the frontal posts B to the rear posts B' in horizontal alignment lengthwise along the bin. The same construction is used on the trucks (not shown) except that the framework is mounted on a wheel-borne base for moving from place to place.

The sticks S are of such length as to fit nicely between the verticel webs D' of the angle irons D, thus resting at their ends on the horizontal webs D'' as shown. Sausages or other meats M are then hung on the sticks S, and with the sticks placed in the bin the meats may be readily reached and viewed through the openings between the frontal posts B.

The bearing between the ends of the sticks S and the supporting webs D'' of the angle irons D is necessarily very short as shown, and should a stick be slipped forward or back at either end it may readily fall down off the web D'' so that the stick and the meats supported thereon fall to the floor, with the damaging and expensive results hereinbefore set out. Also it will be evident that the sticks may very readily move at their ends forwardly and rearwardly along the angle irons D, and, in the case of trucks, this often occurs due to vibration thereof and the sticks often fall.

In carrying out my invention I provide as one embodiment thereof an elongated metal strip 6 of suitable width and thickness and bend the same crosswise at intervals to give it a corrugated, sinuous or undulating form, thus providing a number of spaced stick receiving pockets, sockets or seats 7 spaced apart by intervening upwardly projecting stops, stop peaks, risers or bights 8. The strip 6 thus formed is of such length as to cover the entire length of the web D'' of the angle iron D on which it is placed. Mounting ears or tabs 13 and 14 are extended laterally and oppositely from the upper extremities of several of the stops 8 and from the lowermost portions of several of the pockets 7. The strip may then be mounted on the angle iron without alteration or drilling thereof simply by folding the ears 13 down over the upper edge of the web D' and folding the ears 14 over the inner edge of the web D'' so that these ears lock over the angle iron and hold the strip in place thereon.

In use the sticks S are simply dropped at their ends into the pockets 7, wherein they are then held, as will be understood, against slipping off the angle irons D at their ends, and the above mentioned loss and breakage are thus avoided. Also the intervening stops 8 hold the sticks in spaced relation, preventing sausages from being mashed and injured, and this spacing may be increased if desired simply by placing the sticks in only every other pocket, as will be understood.

While I have herein set forth certain preferred embodiments of my invention it is understood that I may vary from the same in details so as best to provide a practical assembly for the purpose intended and so as best to meet the exigencies of various installations, not departing from the spirit of the invention and within the scope of the appended claims.

I claim:

1. In combination with an angle iron disposed and supported to receive the ends of sausage and meat sticks, a corrugated metal strip mounted on the angle iron and having spaced depressions to receive the ends of the sticks, and ears extended laterally from the margins of the strip whereby they may be bent over the edges of the angle iron to secure the strip thereto.

2. In combination with an angle iron having one web turned horizontally and the other vertically and upwardly, a hanger strip corrugated and including downwardly curved pockets separated by intervening upthrust stops, ears extended laterally from the lowermost portions of the pockets and turned downwardly and then inwardly over the free margin of the horizontal web of the angle iron, and ears extended from the opposite sides of the uppermost portions of the said stops and turned downwardly over the upper edges of the vertical web of the angle iron.

JOHN BITZER.